(12) United States Patent
Howerton (10) Patent No.: US 9,476,597 B1
(45) Date of Patent: Oct. 25, 2016

(54) ADJUSTABLE OVEN

(71) Applicant: Jerry T. Howerton, Kegley, WV (US)

(72) Inventor: Jerry T. Howerton, Kegley, WV (US)

(*) Notice: Subject to any disclaimer, the term of this patent is extended or adjusted under 35 U.S.C. 154(b) by 187 days.

(21) Appl. No.: 13/659,877

(22) Filed: Oct. 24, 2012

(51) Int. Cl.
*F24C 14/02* (2006.01)
*F24C 7/00* (2006.01)
*F24C 15/02* (2006.01)
*H05B 3/66* (2006.01)
*A47J 37/01* (2006.01)
*F24C 7/06* (2006.01)

(52) U.S. Cl.
CPC .............. *F24C 14/02* (2013.01); *A47J 37/015* (2013.01); *F24C 7/00* (2013.01); *F24C 7/06* (2013.01); *F24C 15/02* (2013.01); *H05B 3/66* (2013.01)

(58) Field of Classification Search
CPC .......... F24C 14/02; F24C 15/02; F24C 7/00; F24C 7/06; H05B 1/0015; H05B 3/66; A47J 37/015
USPC ........... 219/391–393, 402–405; 16/431, 436; 126/190–192, 197; 220/263
See application file for complete search history.

(56) References Cited

U.S. PATENT DOCUMENTS

| 1,586,738 | A |   | 6/1926  | Guy-Pell |
| 2,218,961 | A |   | 10/1940 | Schulz |
| 2,498,554 | A |   | 2/1950  | Klein |
| 3,161,755 | A | * | 12/1964 | Tilus ......................... F24C 7/06 219/403 |
| 3,548,154 | A | * | 12/1970 | Christiansson ............... 219/403 |
| 3,982,096 | A | * | 9/1976  | Dills ............................. 219/403 |
| 4,638,529 | A | * | 1/1987  | Katona ................. E05B 1/0015 126/190 |
| 4,780,597 | A | * | 10/1988 | Linhart ................. F24C 15/166 219/396 |
| 5,928,544 | A |   | 7/1999  | Bennet |
| 5,994,673 | A |   | 11/1999 | El-Shoubary et al. |
| 6,008,478 | A | * | 12/1999 | Crone et al. .................. 219/402 |
| 7,071,448 | B1 |  | 7/2006  | Kim et al. |
| 7,183,520 | B2 |  | 2/2007  | Park |
| 7,442,901 | B2 |  | 10/2008 | Kim et al. |
| 7,781,702 | B2 | * | 8/2010 | Nam ......................... F24C 7/06 219/386 |
| 2004/0031782 | A1 | * | 2/2004 | Westfield ...................... 219/391 |
| 2006/0081622 | A1 | * | 4/2006 | Cho ...................... F24C 15/022 219/685 |
| 2010/0175680 | A1 | * | 7/2010 | Han ...................... F24C 15/021 126/190 |

FOREIGN PATENT DOCUMENTS

GB             430103        6/1935

* cited by examiner

*Primary Examiner* — Dana Ross
*Assistant Examiner* — Kuangyue Chen
(74) *Attorney, Agent, or Firm* — Johnston Holroyd; Mary-Jacq Holroyd (57) ABSTRACT

An adjustable oven having a floor and heating element that can be adjusted from a lower position to an upper position forming a smaller cooking space. An oven door has grooves to accommodate an adjustable oven floor, and a handle extending perpendicular to the face of the oven the door, and along the plane of the side wall, for opening the door in which one hand may be used.

20 Claims, 6 Drawing Sheets

ADJUSTABLE OVEN

RELATED APPLICATIONS

This application claims the benefit of U.S. Provisional Application Ser. No. 61/550,853 entitled "ADJUSTABLE OVEN" filed on 24 Oct. 2011, the contents of which are incorporated herein by reference in its entirety.

BACKGROUND OF THE INVENTION

The idea of an oven with adjustable cooking chambers is known, and in particular, separate consumer cooking ovens with adjustable heating elements and heating space dividers are known. Several efforts have been made to provide a smaller cooking space for baking ovens. Such ovens are frequently used in pizzerias, bakeries, fast food restaurants, groceries, and the like, in which standardized cooking spaces are desirable for commercial production to reduce cost, maximize use of space, and more evenly heat the interior. Flexible ovens for the use in homes, which can be transformed from larger to smaller spaces, have been a challenge for designers.

U.S. Pat. No. 5,994,673 ('673) teaches a variable volume oven that allows the volume to be adjusted according to the cooking load by providing a heating element that is vertically adjustable within the oven to a position that provides better convective and radiative heating to the cooking load. Supporting grooves are provided along the sides to support the heating elements at each level in which an exposed electric plug (to accommodate the heating element) is located. The oven floor is not adjustable in the '673 patent, and a smaller cooking space is not provided for; however, the heating element is closer to the cooking foods, but still heats the area beneath the cooking element.

U.S. Pat. Nos. 7,442,901 and 7,183,520 each disclose electric ovens which have heating space dividers with separate convection heating systems that are separately operable. The heating space dividers fit along groves or supports analogous to rack supports. Similarly, U.S. Pat. No. 7,071,448 teaches a cooking chamber with a partition member for a conventional electric oven, except that two vents are provided, and electrical cooking elements are provided at the top and bottom of the larger oven chamber; the partition member simply being insertable into grooves along the sides of the chamber. These inventions lack truly adjustable oven bottoms, and merely describe solid partitions for use to separate ovens into two separate cooking areas. Furthermore, none of these references describe oven doors that accommodate the adjustable oven parts, but are instead conventional oven doors.

Examples of related patents include an old U.S. Pat. No. 2,218,961 from 1939 that describes a gas range construction which has an adjustable broiler and broiler pan that may be moved up and down the inside of the oven to form a smaller cooking chamber. Another arcane patent includes U.S. Pat. No. 1,586,738 which teaches a cooking apparatus with an adjustable heating chamber. U.S. Pat. No. 5,928,544 shows a cooking applicant with movable base unit having two heating elements providing heat from above or below the food cooked. U.S. Pat. No. 2,498,554 teaches a detachable bottom for ovens or broilers. The British patent GB 430,103 teaches improvements relating to cooking ovens having partitions disposed therein through grooves disposed along the sides of the heating chamber.

SUMMARY OF THE INVENTION

The present invention is an adjustable oven having a floor that is adjustable to create a smaller cooking chamber, i.e., heating space. The heating element is also adjustable to remain just above the adjustable floor. The heating element may be attached to the floor, and be adjustable therewith, or it may be separately adjustable. The oven door accommodates the floor to form a seal as in a conventional oven, and has a window along the top thereof to view the narrowest cooking chamber. Grooves are provided along the side and back walls to accommodate the adjustable floor. An oven gasket is provided about the circumference of the floor to both accommodate the walls and the door to form a seal thereabout when the door is closed. Porcelain receptacles are provided at each floor level for accommodating the heating element.

A special handle is provided for on the doors to ease opening and closing thereof. The handle extends perpendicularly to standard oven door handles, and also extends above the door, to ease closing the door when open.

The economy thirty inch standard electric range has a full size oven. Double door ranges are extremely expensive, and have fixed cooking spaces.

An aspect of the present invention is that it provides an adjustable cooking space that is thermally closed so that only the space necessary is heated.

Another aspect of the present invention is that it saves money and time by heating a smaller space.

Yet another aspect of the present invention is providing a door handle that is ergonomically sound.

Improvements include exposed bake element or hidden bake element with oven holes. The adjustable floor is coated under the bare element. The new handle system uses thumb and fingers to grab the top part of the handle and pivots as the door opens and closes. Less strain is placed on the wrists.

These and other aspects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

Similar reference characters denote corresponding features consistently throughout the attached drawings.

DETAILED DESCRIPTION OF PREFERRED EMBODIMENTS

Figure 1:
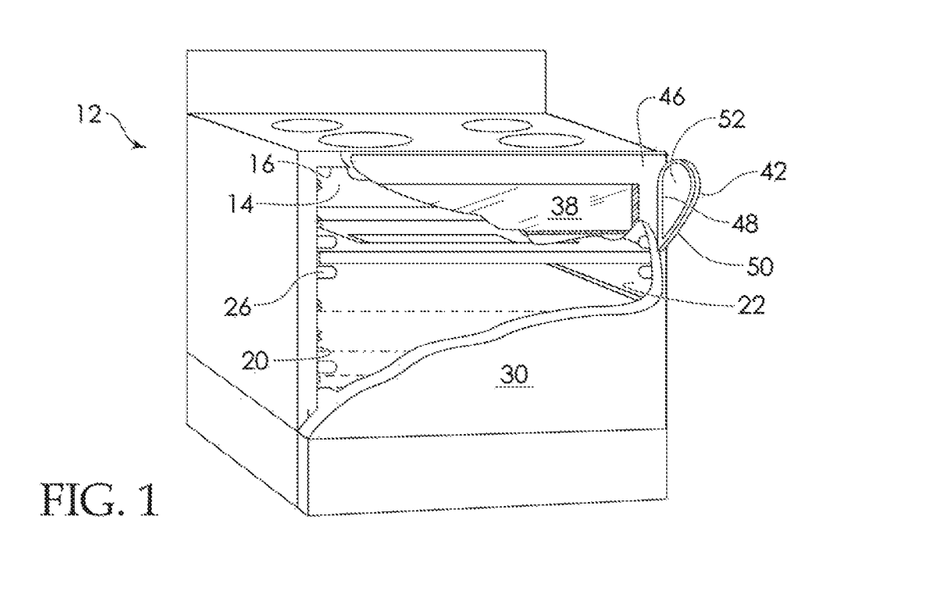
FIG. 1 shows an environmental side view of an adjustable oven according to alternative embodiments of the present design.

An adjustable oven 12, shown in FIG. 1, has a cooking chamber 14 with a roof 16 and a conventional upper heating element (not shown) disposed adjacent and just beneath the roof 16. The adjustable oven 12 according to alternatives of the present design may be incorporated into a standard oven, a stove top oven, or a built in oven that does not have a stove top. Although FIG. 1 shows a consumer stove top adjustable oven 12, the present invention is not limited to such a design. Furthermore, the conventional details of a stove top oven or built in oven are not shown.

Figure 2:
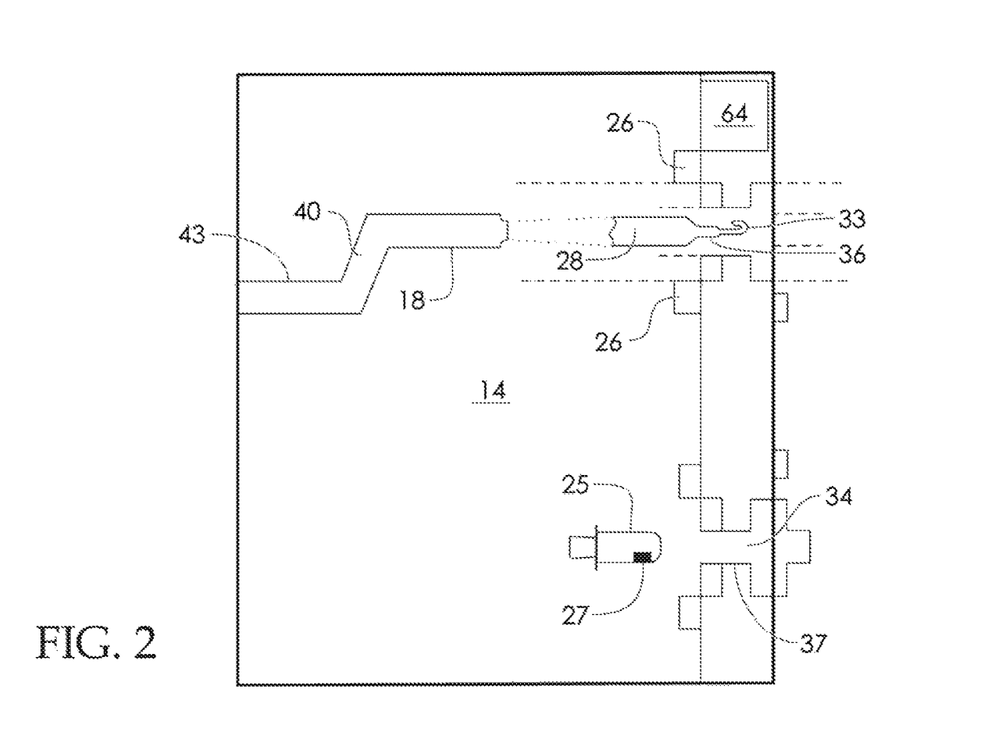
FIG. 2 shows a side plan view of an adjustable oven according to alternative embodiments of the present design.

The oven 12 has a floor 18, two side walls 20 and 22, and a back wall 24. The floor 18, as shown in FIG. 2, is slidably engaged in at least one set of grooves 26 in the back wall 24 and disposed along the side walls 20 and 22, as shown in 1, and to accommodate the floor 18.

Figure 3:
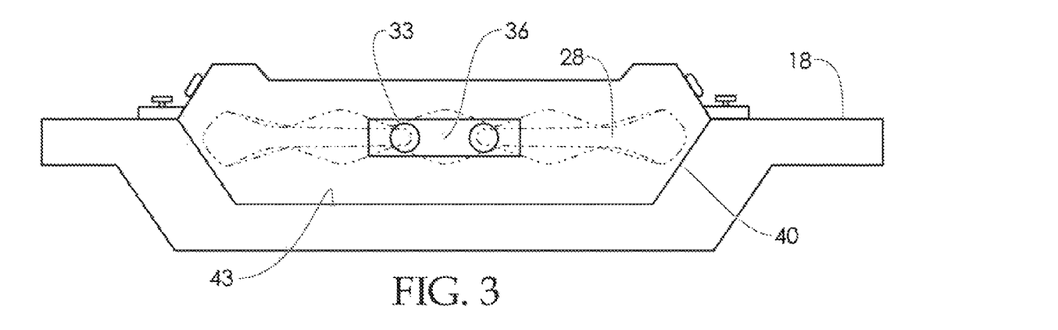
FIG. 3 shows a cutaway side view of a removable floor of an adjustable oven according to alternative embodiments of the present design.
Figure 4:
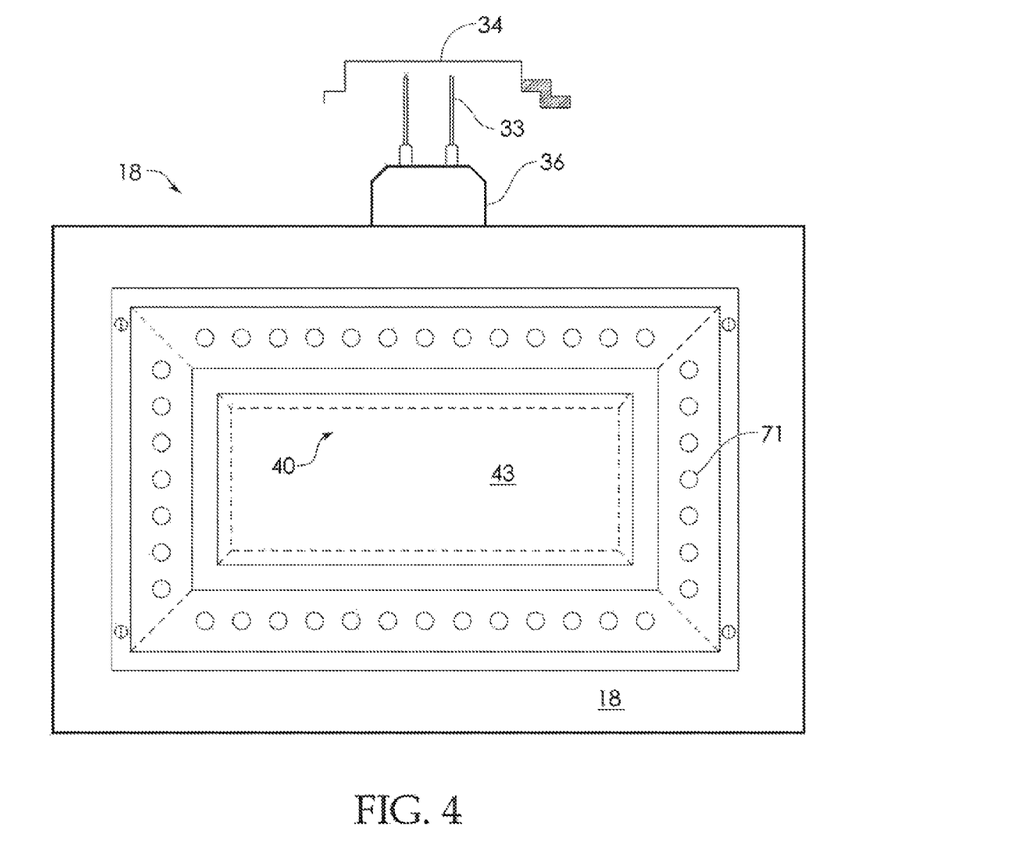
FIG. 4 shows a bottom view of a removable floor of an adjustable oven according to alternative embodiments of the present design.
Figure 5:
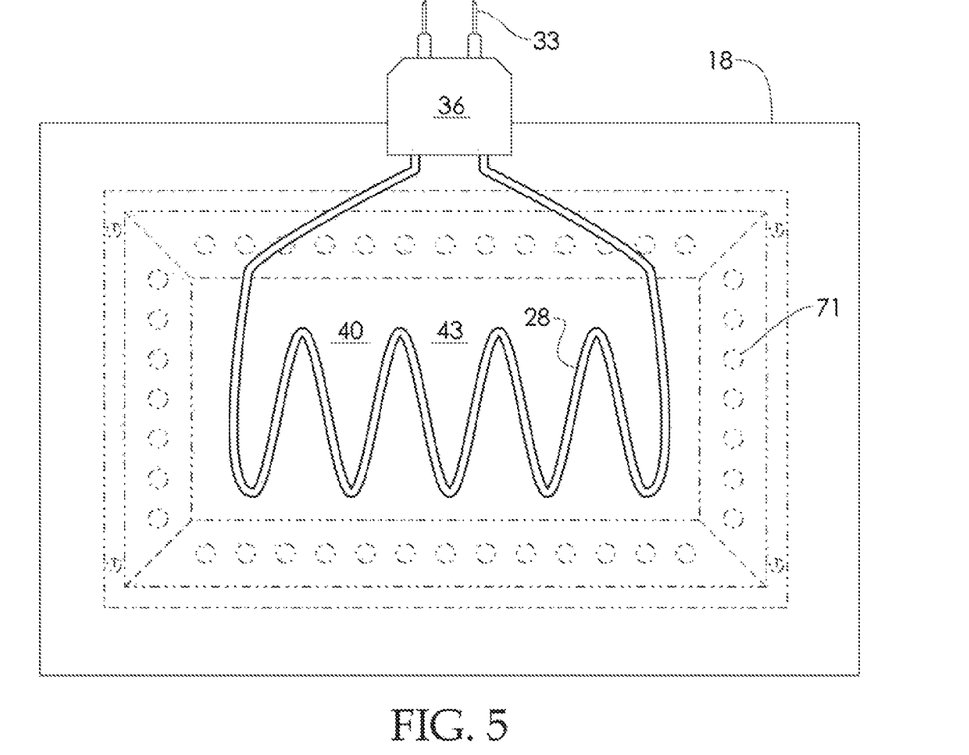
FIG. 5 shows a bottom view of a lower element and removable floor of an adjustable oven according to alternative embodiments of the present design.

A lower heating element 28 is removably engaged above and adjacent the floor 18 to heat the cooking chamber 14 above the floor 18, as shown in FIG. 1. The lower heating element 28 may be removably attached to the floor 18, as shown in FIGS. 3, 4, and 5. The floor 18 has a profile 40 to accommodate the lower heating element 28. The profile 40 may be made large enough to have lower bottom 43 to accommodate cooking debris (not shown).

Figure 6:
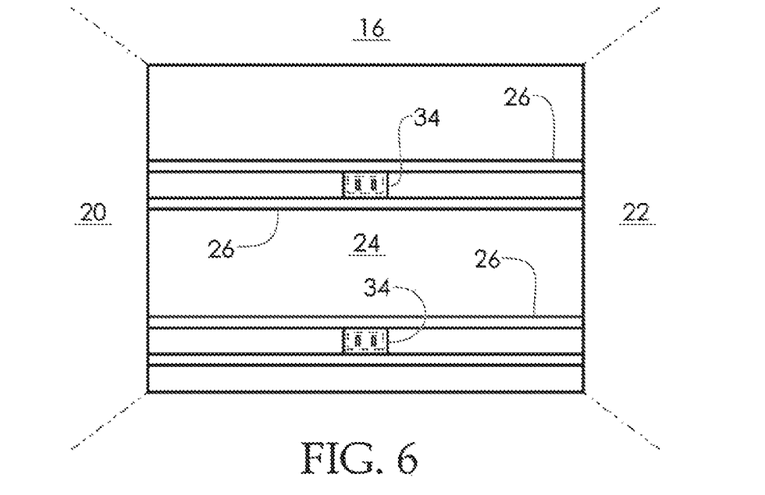
FIG. 6 shows a front view of a back wall of an adjustable oven according to alternative embodiments of the present design.
Figure 7A:
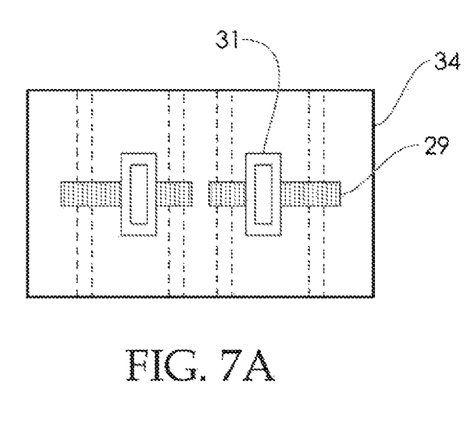
FIGS. 7A and 7B show front views of heating element receptacles optionally utilized by alternative embodiments of the present design.
Figure 7B:
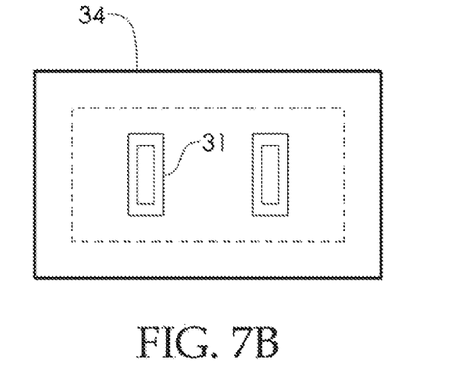
Figure 8A:
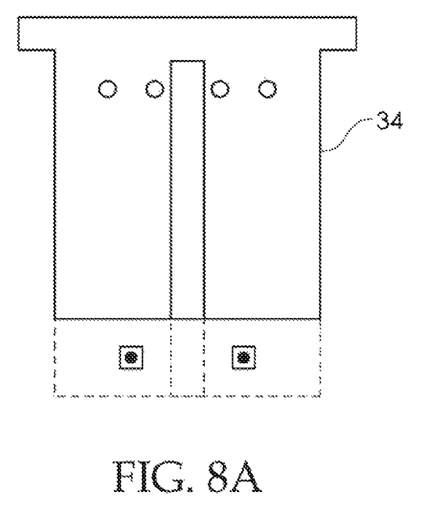
FIGS. 8A and 8B show top views of heating element receptacles optionally utilized by alternative embodiments of the present design.
Figure 8B:
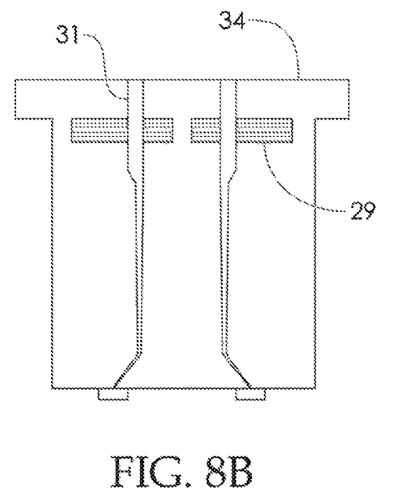

A socket 34 is disposed within each groove 26 of the back wall 24, as shown in FIG. 6, to accommodate and provide power to the heating element 28 via the heating element 28 connectors 36. The lower heating element 28 engages at least one socket 34, to provide power to the heating element 28, disposed in the back wall 24 just above each groove 26 accommodating the floor 18. Details of optional sockets 34 that may be utilized in the present invention are shown in FIGS. 7A, 7B, 8A, and 8B.

Figure 9:
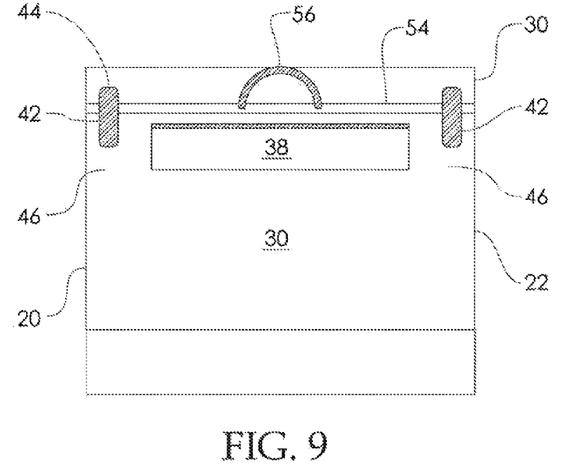
FIG. 9 is a front view of an adjustable oven according to alternative embodiments of the present design.
Figure 10:
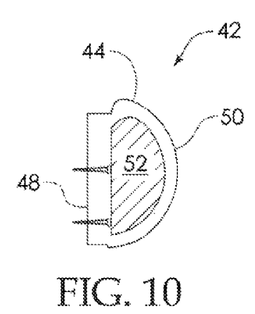
FIG. 10 is a side view of an oven door handle according to alternative embodiments of the present design.
Figure 11:
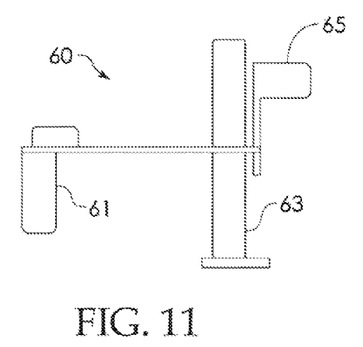
FIG. 11 is a door lock optionally utilized according to alternative embodiments of the present design.
Figure 12:
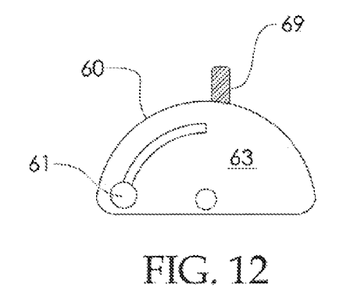
FIG. 12 is an elevated view of a manual door lock for an adjustable oven according to alternative embodiments of the present design.
Figure 14:
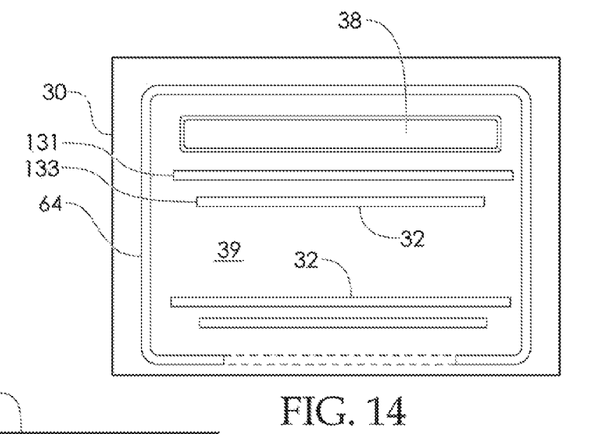
FIG. 14 is a plan view of the inside of an oven door according to alternative embodiments of the present design.
Figure 15:
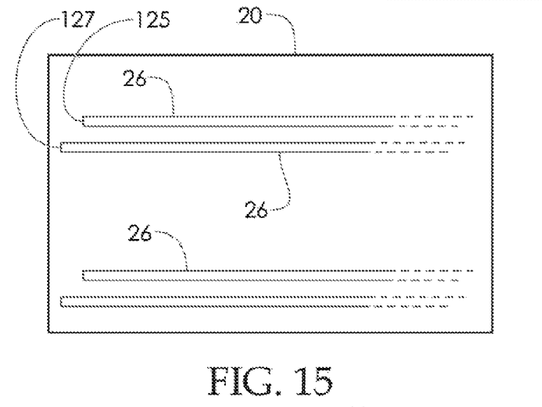
FIG. 15 is a side view of a side wall of an adjustable oven according to alternative embodiments of the present design.
Figure 16:
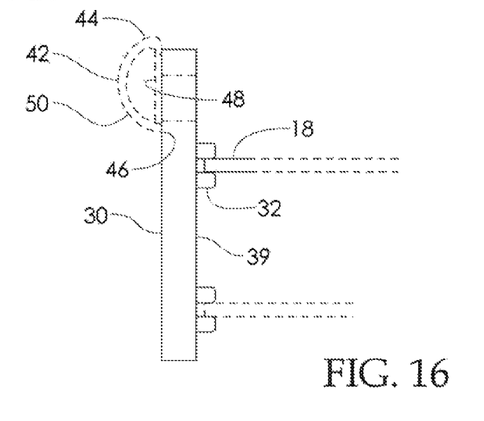
FIG. 16 is a side view of an oven door of an adjustable oven according to alternative embodiments of the present design.

An oven door 30 hingedly attached to the oven 12 in the conventional manner. The front of the oven door is shown in FIGS. 1 and 9. Details of the door handle are shown in FIGS. 1, 9, 10, and 16. FIGS. 14 and 16 show complementary sets of grooves 32 in the back of the door 39, and complementary sets of grooves 26 in the side wall 20, as shown in FIG. 15. The complementary sets of grooves 26 in the side wall 20 and the complementary sets of grooves 32 in the back of the door 39 are designed to complement each other at 127 and 133 and at 125 and 131 to facilitate restricting heat to the cooking chamber 14 as shown by overlapping when the floor 18 is inserted between the grooves 26 and the door 30 is closed. The other side wall 22 is not shown in FIG. 15. FIGS. 11 and 12 shown an optional oven door lock mechanism 60.

The oven door 30 has at least one set of grooves 32 disposed therein to accommodate the floor 18 slidably engaged in the complementary set of grooves 26. The at least one window 38 disposed within the oven door 30 permits viewing into the cooking chamber 14. The door 30 has at least one handle 42 disposed on the door 30 substantially parallel in the place of the adjacent side wall 22, as shown in FIGS. 1, 9, and 16. The handles 42 extend perpendicular to the face of the door 30.

Each handle 42 has an upper part 44 to accommodate a hand grip in the same manner as a cane, or a solid body can extend from the upper part 44. A first side 48 extends downward from the upper part 44, and facilitates attachment of the handle 44 to the face 46 of an oven door 30 so that the handle 42 extends perpendicular from the face 46 of the door 30. A second side 50 may extend from the upper part 44 hand grip opposite the door 30 down to the first side 48 forming an essentially tear drop shape when the upper part 44 is curved. A solid body 52 may be disposed bounded by the upper part 44, and first 48 and second sides 50.

A bar 54 may be present extending between two opposing handles 42, and may also have a looped handle 56 that extends further above the door 30. The looped handle 56 may be a simple metal handle. The 54 bar and/or the two opposing handles 42 may extend above the top 58 of the door 30 when the oven door 30 is closed for easier use. Alternatively, the bar and/or handles may extend below the top 58 of the door 30 when the oven door 30 is closed. Access to the handle 56 and to the handle(s) 42 above the door is helpful when the door is opened so that the door may be more easily closed.

An optional fire resistance heat shield plug may be used in the unengaged sockets 34 when the floor 18 is disposed at a different level. A light socket 34 may be disposed in the back wall 24 to receive a light bulb (not shown) to illuminate the cooking chamber 14. The floor 18 may have fiber glass insulation or any other conventional oven wall or floor material with associated insulation. A gasket 64 may disposed on the oven door 30 to provide a tight seal when the door is closed as is well known in the art.

The sockets 34 and the heater element connector 36 may be configured to securely mate by having a complimentary profile 37. Magnets 27 may also be utilized to hold protective plug 25 in place. The connector 36 may also be held in place by springs 29 disposed in the socket 34. The springs 29 provide tension to the socket 34 openings 31 to hold the tines 33 of the connector 36 in place.

Figure 13:
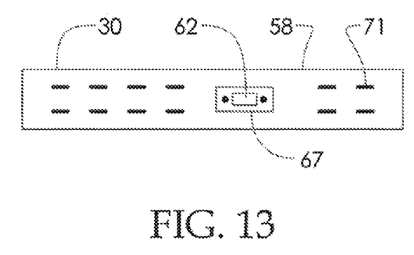
FIG. 13 is a top view of the edge of the oven door of an adjustable oven according to alternative embodiments of the present design.

Any oven lock 60 may be used; however, an embodiment shown in FIGS. 11, 12, and 13 includes a lock handle 61 disposed opposite a body 63, with a wedge metal mechanism 65 to engage the retainer plate 67 at 62. The door lock 60 may have a round knob lock handle 61 and strong magnet 69 to hold the lock 60 in place at 62. Vented openings 71 are distributed throughout as necessary.

It is to be understood that the present invention is not limited to the embodiments described above, but encompasses any and all embodiments within the scope of the following claims.

What is claimed is:

1. An adjustable oven, having a cooking chamber with a roof and an upper heating element disposed adjacent and just beneath the roof, the oven comprising:
   a floor, two side walls, and a back wall;
   an oven door disposed opposite the back wall;
   the floor being slidably engaged in at least one set of complementary grooves disposed along the side and back walls to accommodate the floor; and
   a lower heating element being removably engaged above and adjacent the floor;
   further comprising, at least one additional complementary groove disposed in the oven door opposite the back wall to accommodate the floor slidably engaged in the at least one set of complementary grooves disposed along the side and back walls;
   wherein the complementary grooves disposed in the oven door and in the two side walls form a seal when the floor is slidably engaged in the complementary grooves and the oven door is closed, thereby restricting heat to the cooking chamber above the floor.

2. The oven of claim 1, wherein:
   the lower heating element is removably attached to the floor; or
   the lower heating element engages at least one socket, to provide power to the heating element, disposed in the back wall just above each groove accommodating the floor; or
   combinations thereof.

3. The oven of claim 2, further comprising:
   a socket disposed within each groove of the back wall to accommodate and provide power to the heating element.

4. The oven of claim 1, further comprising:
   at least one window disposed within the oven door to permit viewing into the heating chamber.

5. The oven of claim 1, wherein:
   the door has at least one handle disposed on the door substantially parallel to the plane of the adjacent side wall and extending perpendicular to the face of the door; wherein
   each handle has an uncurved upper part or a curved upper part to accommodate a hand grip, and an open body or a solid body.

6. The oven of claim 5, wherein:
   each handle comprises
   an uncurved upper part or a curved upper part to accommodate a hand grip, and a first side extending downward from the upper part to attach the handle to the side of an oven door so that the handle grip extends perpendicular from the face of the door, a second side extending from the hand grip opposite the door down to the first side; or
   a curved upper part to accommodate a hand grip, and a first side extending downward from the upper part to attach the handle to the side of an oven door so that the handle grip extends perpendicular from the face of the door, a second side extending from the hand grip opposite the door down to the first side essentially forming a tear drop shape; or
   an uncurved upper part or a curved upper part to accommodate a hand grip, and a side extending downward from the upper part to attach the handle to the side of an oven door so that the handle grip extends perpendicular from the face of the door, a second side extending from the hand grip opposite the door down to the first side, the body being solid.

7. The oven of claim 5, further comprising:
   a bar extending between two handles, wherein
   the bar extends above the level of the roof when the oven door is closed, or
   the bar extends below the level of the roof when the oven door is closed.

8. The oven of claim 1, wherein:
   the floor has a profile to accommodate the lower heating coil; and
   the floor has a profile having a lower bottom to accommodate cooking debris.

9. The oven of claim 1, wherein:
   the complementary grooves in the oven door and the complementary grooves in the side walls overlap when the door is closed.

10. An adjustable oven, having a cooking chamber with a roof and an upper heating element disposed adjacent and just beneath the roof, the oven comprising:
    a floor, two side walls, and a back wall;
    an oven door disposed opposite the back wall;
    the floor being slidably engaged in at least one set of complementary grooves disposed along the side and back walls to accommodate the floor; and
    a lower heating element being removably engaged above and adjacent the floor;
    further comprising, at least one additional complementary groove disposed in the oven door opposite the back wall to accommodate the floor slidably engaged in the at least one set of complementary grooves disposed along the side and back walls;
    wherein the complementary grooves disposed in the oven door and in the two side walls form a seal when the floor is slidably engaged in the complementary grooves and the oven door is closed, thereby restricting heat to the cooking chamber above the floor, and wherein
    the complementary grooves in the oven door and the complementary grooves in the side walls overlap when the door is closed.

11. The oven of claim 10, wherein:
    the lower heating element is removably attached to the floor; or
    the lower heating element engages at least one socket, to provide power to the heating element, disposed in the back wall just above each groove accommodating the floor; or
    combinations thereof.

12. The oven of claim 11, further comprising:
    a socket disposed within each groove of the back wall to accommodate and provide power to the heating element.

13. The oven of claim 1, wherein:
    the floor has a profile to accommodate the lower heating coil.

14. The oven of claim 1, wherein:
    the floor has a profile having a lower bottom to accommodate cooking debris.

15. The oven of claim 1, wherein:
    the lower heating element is removably attached to the floor; and
    further comprises, a socket disposed within each groove of the back wall to accommodate and provide power to the heating element.

16. The oven of claim 1, wherein:
    the lower heating element engages at least one socket, to provide power to the heating element, disposed in the back wall just above each groove accommodating the floor.

17. The oven of claim 10, wherein:
the floor has a profile to accommodate the lower heating coil.

18. The oven of claim 10, wherein:
the floor has a profile having a lower bottom to accommodate cooking debris.

19. The oven of claim 10, wherein:
the lower heating element is removably attached to the floor; and
further comprising, a socket disposed within each groove of the back wall to accommodate and provide power to the heating element.

20. The oven of claim 10, wherein:
the lower heating element engages at least one socket, to provide power to the heating element, disposed in the back wall just above each groove accommodating the floor; and
further comprising, a socket disposed within each groove of the back wall to accommodate and provide power to the heating element.

\* \* \* \* \*